United States Patent
Rea et al.

(10) Patent No.: US 9,708,134 B2
(45) Date of Patent: Jul. 18, 2017

(54) MACHINE AND METHOD FOR MAKING SINGLE-USE CAPSULES FOR BEVERAGES

(71) Applicant: IMA INDUSTRIES S.R.L., Ozzano Dell'Emilia (IT)

(72) Inventors: Dario Rea, Monterenzio (IT); Emanuele Rubbi, Castel Guelfo di Bologna (IT); Pierluigi Castellari, Castel San Pietro Terme (IT)

(73) Assignee: GIMA, S.P.A., Zola Predosa (IT)

( * ) Notice: Subject to any disclaimer, the term of this patent is extended or adjusted under 35 U.S.C. 154(b) by 410 days.

(21) Appl. No.: 14/377,744

(22) PCT Filed: Mar. 26, 2013

(86) PCT No.: PCT/IB2013/052395
§ 371 (c)(1),
(2) Date: Aug. 8, 2014

(87) PCT Pub. No.: WO2013/144837
PCT Pub. Date: Oct. 3, 2013

(65) Prior Publication Data
US 2015/0013268 A1    Jan. 15, 2015

(30) Foreign Application Priority Data
Mar. 29, 2012 (IT) .............................. BO2012A0170

(51) Int. Cl.
B65B 29/02 (2006.01)
B65B 35/18 (2006.01)
(Continued)

(52) U.S. Cl.
CPC ............ *B65G 47/848* (2013.01); *B65B 29/02* (2013.01); *B65B 35/18* (2013.01); *B65B 43/50* (2013.01);
(Continued)

(58) Field of Classification Search
CPC ......... B65B 29/02; B65B 35/18; B65B 43/52; B65G 47/52; B65G 47/846; B65G 47/848
(Continued)

(56) References Cited

U.S. PATENT DOCUMENTS 3,143,223 A * 8/1964 McIntyre ................ B65B 35/56
414/788.3
3,151,728 A * 10/1964 Schmermund ......... A24C 5/333
198/404
(Continued)

FOREIGN PATENT DOCUMENTS

EP    0468079 A1    1/1992
EP    0974539 A1    1/2000
(Continued)

*Primary Examiner* — Thanh Truong
*Assistant Examiner* — Patrick Fry
(74) *Attorney, Agent, or Firm* — Pearne & Gordon LLP (57) ABSTRACT

A machine for making single use capsules (1) for extract or infusion beverages comprises: a transport element (8) for transporting rigid containers (2) and configured to define a plurality of pockets (10) for receiving the rigid containers (2) and which are positioned one after the other, in succession, each having a respective vertical axis (Z10); a plurality of stations which are positioned along a path (P) followed by the transport element (8) and which are configured for operating in phase with the same transport element (8) and comprising: a feed station (11) for feeding the rigid containers (2) into respective pockets (10) of the transport element (8); a dosing station (12) for dosing the product into the rigid container (2); a closing station (13) for closing the rigid container (2) with a length of sheet (7); an outfeed station (14) which withdraws the capsules (1) from the transport element (8); the outfeed station (14) comprises a contact head (21) for contacting and picking a capsule (1)
(Continued)

from a respective pocket (10) of the transport element (8) and placing the capsule (1) on a receiving table (20).

13 Claims, 6 Drawing Sheets (51) Int. Cl.
  *B65B 43/50*  (2006.01)
  *B65B 43/52*  (2006.01)
  *B65B 43/54*  (2006.01)
  *B65B 65/00*  (2006.01)
  *B65G 37/00*  (2006.01)
  *B65G 47/84*  (2006.01)
(52) U.S. Cl.
  CPC .............. *B65B 43/52* (2013.01); *B65B 43/54* (2013.01); *B65B 65/003* (2013.01); *B65G 37/00* (2013.01); *B65B 2210/02* (2013.01)
(58) Field of Classification Search
  USPC .................. 53/466, 544; 198/468.4
  See application file for complete search history.

(56) References Cited

U.S. PATENT DOCUMENTS

| | | | | |
|---|---|---|---|---|
| 3,253,694 A | * | 5/1966 | Kinney | B65G 47/244 |
| | | | | 198/374 |
| 3,587,816 A | * | 6/1971 | Russell | B41F 17/28 |
| | | | | 101/40.1 |
| 4,002,005 A | * | 1/1977 | Mueller | B65B 9/02 |
| | | | | 53/143 |
| 4,067,433 A | * | 1/1978 | Phipps | B65B 35/56 |
| | | | | 198/374 |
| 4,151,698 A | * | 5/1979 | Muller | B65B 3/04 |
| | | | | 53/131.2 |
| 4,771,589 A | * | 9/1988 | Mueller | B65B 21/025 |
| | | | | 198/404 |
| 5,191,964 A | * | 3/1993 | Spisak | B65G 47/848 |
| | | | | 198/430 |
| 6,206,169 B1 | * | 3/2001 | Spatafora | B65B 35/04 |
| | | | | 198/347.1 |
| 6,311,824 B1 | * | 11/2001 | Van Pul | B65G 47/848 |
| | | | | 198/370.12 |
| 6,718,737 B2 | * | 4/2004 | Otsuka | B65B 5/067 |
| | | | | 198/402 |
| 7,077,619 B2 | * | 7/2006 | Corrigan | B65G 47/846 |
| | | | | 414/744.4 |
| 7,273,343 B2 | * | 9/2007 | Ziegler | B65G 47/915 |
| | | | | 198/474.1 |
| 8,539,743 B2 | * | 9/2013 | Rapparini | B65B 9/042 |
| | | | | 53/122 |
| 9,428,329 B2 | * | 8/2016 | Trombetta | B65D 85/8043 |
| 2009/0193767 A1 | | 8/2009 | Poget et al. | |
| 2011/0016834 A1 | | 1/2011 | Rapparini | |
| 2012/0233967 A1 | * | 9/2012 | Bellante | B25J 9/0084 |
| | | | | 53/443 |
| 2014/0230370 A1 | * | 8/2014 | Bianchi | B65B 29/02 |
| | | | | 53/410 |

FOREIGN PATENT DOCUMENTS

| | | | | |
|---|---|---|---|---|
| GB | 2172257 A | * | 9/1986 | ............ B65B 5/105 |
| GB | 2438187 A | | 11/2007 | |
| WO | 2008129350 A1 | | 10/2008 | |
| WO | 2010007633 A1 | | 1/2010 | |

* cited by examiner

MACHINE AND METHOD FOR MAKING SINGLE-USE CAPSULES FOR BEVERAGES

TECHNICAL FIELD

This invention relates to a beverage capsule machine for making single use capsules for extract or infusion beverages such as coffee, tea, milk, chocolate or combinations of these ingredients.

BACKGROUND ART

The above mentioned capsules, used in machines for making these beverages, comprise in their simplest form, the following:
a rigid, cup-shaped container comprising a perforatable or perforated bottom and an upper aperture provided with a rim (and usually, but not necessarily, having the shape of a truncated cone);
a dose of extract or infusion beverage product contained in the rigid container; and
a length of sheet obtained from a web for sealing the aperture of the rigid container and designed (usually but not necessarily) to be perforated by a nozzle which supplies liquid under pressure.

Usually, but not necessarily, the sealing sheet is obtained from a web of flexible material.

In some cases, the capsules may comprise one or more rigid or flexible filtering elements. For example, a first filter (if present) may be located on the bottom of the rigid container. A second filter (if present) may be interposed between the seal and the product dose.

The capsule made up in this way is received and used in specific slots in machines for making beverages.

At present, capsules of this kind are made using machines which operate in "step by step" fashion.

One known example of machines of this kind is described in patent publication WO 2010/007633.

The machine described in WO 2010/007633 comprises a conveyor belt which is closed in a loop around two power-driven horizontal-axis pulleys in such a way as to form an upper, active section and a lower, non-operative return section.

The belt comprises a series of successive pockets which receive the rigid containers fed by a corresponding station located above the active section of the belt.

As it moves stepwise along a feed direction, the active section of the belt positions each pocket with a respective rigid container in it under a series of stations for making up the capsule.

Basically, the station which feeds the rigid container is followed by at least one station for dosing the product into the rigid container, a station for closing the upper aperture of the rigid container with a length of film (for example by heat-sealing) and, lastly, a station for feeding out the capsules thus made.

It should be noted, however, that along the rectilinear, active section of the belt, there may be further, auxiliary stations, for example to check capsule weight and to form the length of film, filter application stations, means for removing rejects, and so on.

However, a single production line combined with step by step operation has proved to be low in productivity per unit time.

To overcome this problem, the belt was made wider in the direction transversal to the direction of belt feed so as to form two or more juxtaposed rows of pockets for receiving respective rigid containers.

This technical choice, however, meant augmenting the installed stations, like those mentioned above, placed side by side in a horizontal plane transversely to the feed direction of the active section of the belt.

While this solution on the one hand partly increased the overall productivity of the machine per unit time, on the other it made the machine more cumbersome and decidedly more expensive and increased the risks of machine shutdowns owing to the large number of devices operating along the active section of the belt.

This structural choice does not therefore balance the overall costs with the results of operational productivity and does limit the operating speed of the machine.

AIM OF THE INVENTION

The aim of this invention is to provide a beverage capsule machine for making single use capsules for extract or infusion beverages such as coffee or tea and which overcomes the above mentioned disadvantages of the prior art.

More specifically, this invention has for an aim to provide a beverage capsule machine for making single use capsules for extract or infusion beverages such as coffee or tea and which is capable of guaranteeing high productivity per unit time, with high operating speeds and a reduced number of operating stations, and guaranteeing also a high level of dependability.

A further aim of the invention is to provide a beverage capsule machine for making single use capsules for extract or infusion beverages such as coffee or tea and which has a compact structure, is reduced in size and makes good quality products.

A further aim of the invention is to provide a machine with an operating station for capsule outfeed capable of attaining a capsule outfeed speed suitable for the operating speed of the rest of the machine.

A further aim of the invention is to provide a machine with a capsule outfeed operating station of reduced size and designed to feed the capsules out in a predetermined position suitable for final packaging.

A further aim of the invention is to provide a capsule picking and placing process capable of achieving high pick and place precision combined with high production speed.

These aims are fully achieved by a beverage capsule machine for making single use capsules for extract or infusion beverages according to the invention as characterized in the appended claims.

These aims are also fully achieved by a process for picking and placing single use capsules for extract or infusion beverages as characterized in the appended claims.

A machine according to the invention for making single use capsules for extract or infusion beverages comprises: a transport element for transporting rigid containers and being closed in a loop around movement means for moving the transport element; the transport element being configured to define a plurality of pockets for receiving the rigid containers and which are positioned one after the other, in succession, each having a respective vertical axis; a plurality of stations which are positioned along a path followed by the transport element and which are configured for operating in phase with the transport element and comprising: a feeding station for feeding the rigid containers into respective pockets of the transport element; a dosing station for dosing the product into the rigid container; a closing station for closing the rigid container with a length of sheet; an outfeed station which picks and places the capsule.

According to the invention, the outfeed station of the machine comprises a first wheel equipped with at least one contact head for contacting and picking a capsule from a respective pocket of the transport element and placing the capsule on a receiving table; and with movement means for moving the at least one contact head from an advanced position to contact and pick the capsule from the respective pocket of the transport element and to place the capsule on the receiving table, to a withdrawn position when the contact head is in transit. The first wheel is configured to rotate the at least one contact head and the movement means in phase and in order to carry the at least one contact head from the pocket of the transport element to the receiving table along a first stretch of path and from the receiving table to the transport element along a second stretch of path.

According to the invention, the outfeed station also comprises a second wheel equipped with at least one further contact head to contact and pick a further capsule from a respective pocket of the transport element and place the further capsule on the receiving table; and with further movement means for moving the at least one further contact head from an advanced position to contact and pick the further capsule from the respective pocket of the transport element and to place the further capsule on the receiving table, to a withdrawn position when the further contact head is in transit. The second wheel is configured to rotate the at least one further contact head and the further movement means in phase and in order to carry the at least one further contact head from the pocket of the transport element to the receiving table along a further first stretch of path and from the receiving table to the transport element along a further second stretch of path.

According to the invention, the first and second wheels are equipped with respective power driven shafts which are in phase with each other and which rotate in the same direction of rotation to allow the at least one contact head and the at least one further contact head to place capsules and further capsules on the receiving table, respectively, the further capsules being alternated, juxtaposed and oriented in the opposite direction relative to the capsules on the receiving table.

A machine equipped with an outfeed station of this kind is capable of operating with extreme precision, also guaranteeing dependability and operating flexibility.

A process according to the invention for picking and placing single use capsules for extract or infusion beverages, made in a machine comprising a transport element closed in a loop around movement means designed to move the transport element; the transport element being configured to define a plurality of pockets for the capsules, having a vertical axis and positioned one after the other, in succession, comprises the steps of picking the capsules from respective pockets of the transport element through the agency of at least one contact head connected to movement means of a first wheel; moving the capsules away from the respective pockets by a movement of the movement means combined with a rotation of the first wheel in a first direction; transporting the capsules held by the at least one contact head along a first path with a curved trajectory, which allows a first rotation of the capsules through a first angle, towards a receiving table; placing the capsules on the receiving table through the agency of the at least one contact head at the end of the first stretch of path.

A process according to the invention also comprises the steps of picking further capsules from the respective pockets of the transport element through the agency of at least one further contact head connected to further movement means of a second wheel; the further capsules being picked downstream of the capsules relative to a feed direction of the transport element; moving the further capsules away from the respective pockets by a further movement of the further movement means combined with a rotation of the second wheel in a second direction which is the same as the first direction of rotation, the first wheel being mounted alongside the second wheel; transporting the further capsules held by the at least one further contact head along a further first stretch of path with a curved trajectory, which allows a second rotation of the further capsules through a second angle, different from the first angle, towards the receiving table; placing the further capsules on the receiving table through the agency of the at least one further contact head at the end of the further first stretch of path, the further capsules being alternated, juxtaposed and oriented in the opposite direction relative to the capsules on the receiving table.

According to the invention, the process comprises a step of feeding out the capsules and further capsules along the receiving table away from the first wheel and from the second wheel.

BRIEF DESCRIPTION OF THE DRAWINGS

These and other features of the invention will become more apparent from the following detailed description of a preferred, non-limiting embodiment of it, with reference to the accompanying drawings, in which.

DETAILED DESCRIPTION OF PREFERRED EMBODIMENTS OF THE INVENTION

With reference to the accompanying drawings, the machine according to this invention (denoted in its entirety by the numeral 100) is used to make single use capsules for extract or infusion beverages such as coffee, tea, milk, chocolate or combinations of these ingredients.

Figure 2:
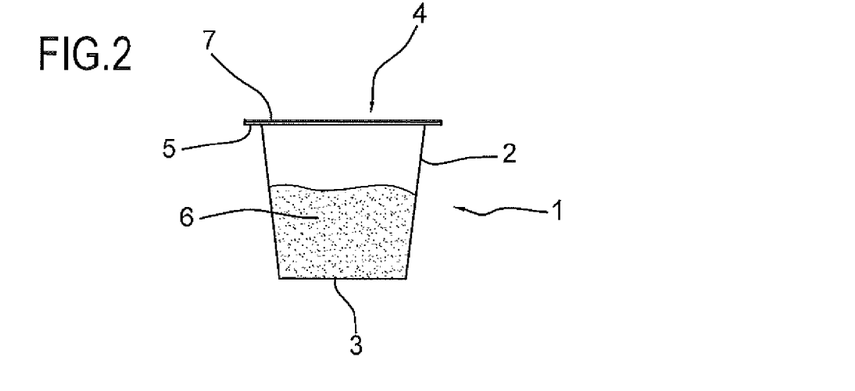
FIG. 2 is a schematic side view of an example of a single use capsule, made with the machine of FIG. 1, for extract or infusion beverages such as coffee, tea, milk, chocolate or combinations of these ingredients.

More specifically—see FIG. 2—single use beverage capsules 1 comprise, in a minimum, non-limiting configuration:

a rigid, cup-shaped container 2 (usually in the shape of a truncated cone) comprising a bottom 3 and an upper aperture 4 provided with a rim 5; a dose 6 of product for extraction or infusion contained within the rigid container 2 and a length of sheet 7 for sealing the upper aperture 4 of the rigid container 2.

If the length of sheet 7 is to be perforated when the beverage is made, the length of sheet 7 forms a hermetic seal for the rigid container 2.

It should be noted that the length of sheet 7 is obtained from a flexible web, that is to say, a web of material having flexibility properties.

Alternatively, the length of sheet 7 may be a rigid element.

It should also be noted that this type of capsule 1 may also comprise one or more filtering or product retaining elements (not illustrated here for simplicity reasons).

More specifically, a first filter may be located on the bottom of the rigid container in order to improve the distribution of the infusion product. The first filter may be a rigid filter. Alternatively, the first filter may be a flexible filter.

The capsule 1 may also comprise a second filter positioned between the length of sheet 7 and the product dose: in this case, the second filter allows improved (uniform) distribution of the liquid on the product.

The machine 100 (see FIG. 1) comprises a transport element 8 for transporting the components of the capsule 1.

Figure 1:
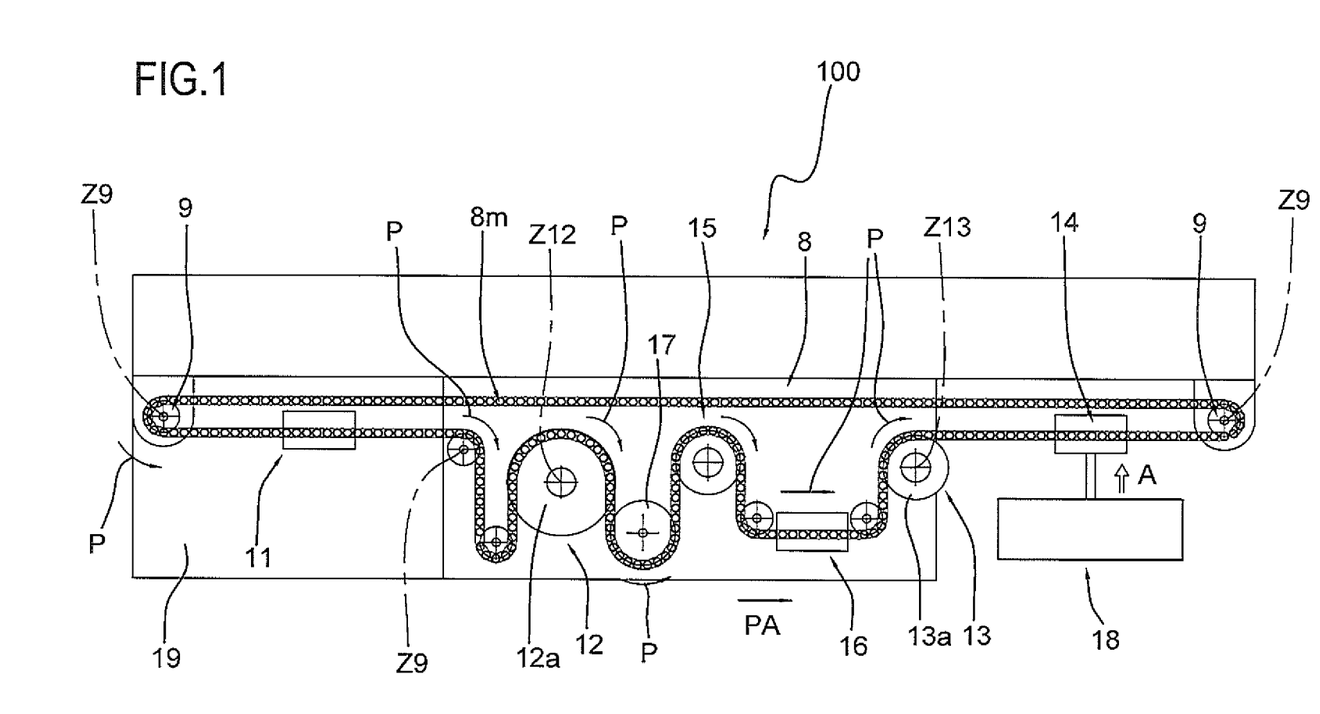
FIG. 1 is a schematic top plan view of a beverage capsule machine for making single use capsules for extract or infusion beverages such as coffee, tea, milk, chocolate or combinations of these ingredients.

The transport element 8 is closed in a loop around movement means 9 which rotate about axes Z9 for moving the transport element 8.

More preferably, but not necessarily, the movement means 9 rotate continuously about vertical axes Z9 to allow the transport element 8 to move continuously. Alternatively, the movement means 9 rotate step by step.

Figure 3:
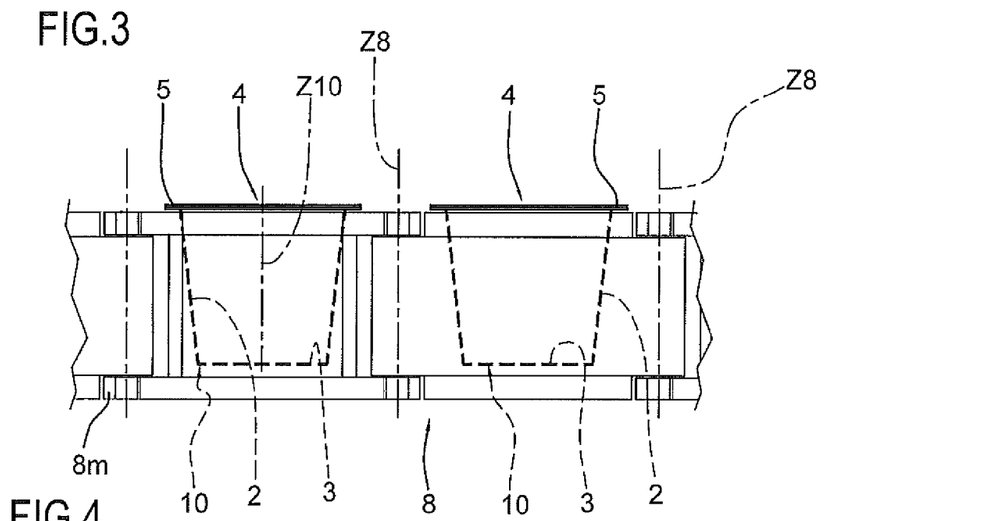
FIGS. 3 and 4 are a schematic side view and a schematic top plan view illustrating a part of a transport element for transporting a rigid container.
Figure 4:
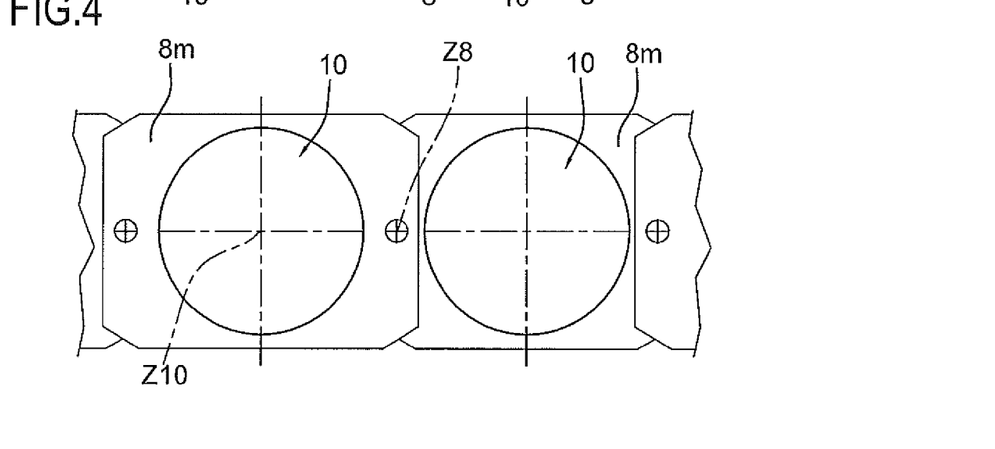

More specifically, the transport element 8 is configured to define a plurality of pockets 10 for receiving the rigid containers 2 and arranged one after the other in succession, not necessarily continuous, each having a respective vertical axis Z10 (see also FIGS. 3 and 4).

It should be noted that the machine 100 comprises a plurality of stations which are positioned along a path P followed by the transport element 8 and which are configured for operating in phase (continuously or step by step) with the transport element 8 and comprising at least four basic stations.

A feeding station 11 feeds the rigid containers 2 into respective pockets 10 of the transport element 8.

A dosing station 12 doses the extract or infusion product into the rigid container 2.

A closing station 13 closes the aperture 4 of the rigid container 2 with the length of sheet 7.

An outfeed station 14 withdraws the capsule 1 formed from the transport element 8.

Preferably, the transport element 8 is a chain comprising a plurality of links 8m, hinged to one another in succession about corresponding vertical axes Z8 to form an endless loop.

It should be noted that at least one chain link 8m comprises at least one pocket 10, with a vertical axis Z10, for receiving a respective rigid container 2 positioned with the aperture 4 facing upward.

It should be noted that the chain 8 may comprise links 8m, each comprising a respective pocket 10 with a vertical axis Z10 for a respective component (rigid container 2), as well as connecting links which are not provided with pockets 10 and which are interposed between links 8m which are provided with pockets 10. In other words, the links 8m provided with pockets 10 might not be in continuous succession (this embodiment not being illustrated).

Preferably, each link 8m of the chain 8 comprises at least one pocket 10, with a vertical axis Z10, for receiving a respective rigid container 2 positioned with the aperture 4 facing upward.

It should be noted that a chain made in this way forms at least one single row of rigid containers 2 moving continuously along a predetermined path P.

According to the invention, the outfeed station 14 comprises at least one contact head 21 for contacting and picking a capsule 1 from a respective pocket 10 of the transport element 8 and placing the capsule 1 on a receiving table 20.

Also according to the invention, the outfeed station 14 comprises movement means 23 for moving the contact head 21 from:
an advanced position to contact and pick the capsule 1 from the respective pocket 10 of the transport element 8 and to place the capsule 1 on the receiving table 20, to
a withdrawn position when the contact head 21 is in transit or waiting.

Passing from the advanced position to the withdrawn position, the contact head 21 extracts the capsule 1 from the pocket 10. Passing from the withdrawn position to the advanced position, the contact head 21 places the capsule 1 on the receiving table 20.

Also according to the invention, the outfeed station 14 comprises at least one first wheel 22 for rotating the contact head 21 and the movement means 23 and configured to operate in phase therewith and with the transport element 8 and to carry the contact head 21 from the pocket 10 of the transport element 8, where it picks the capsule 1, to the receiving table 20 along a first stretch P24A of path, and from the receiving table 20 to the transport element 8 along a second stretch P24R of path.

Thanks to this structure of the outfeed station 14, the capsules 1 can be handled securely and in rapid succession in such a way as to empty the pockets 10 and place the capsules 1 correctly on the receiving table 20.

In a preferred embodiment (see FIGS. 5 and 6), the outfeed station 14 comprises a first wheel 22 and a second wheel 24. The transport element 8 carries capsules 1 intended to be picked from the first wheel 22 and further capsules 1' intended to be picked from the second wheel 24.

Figure 5:
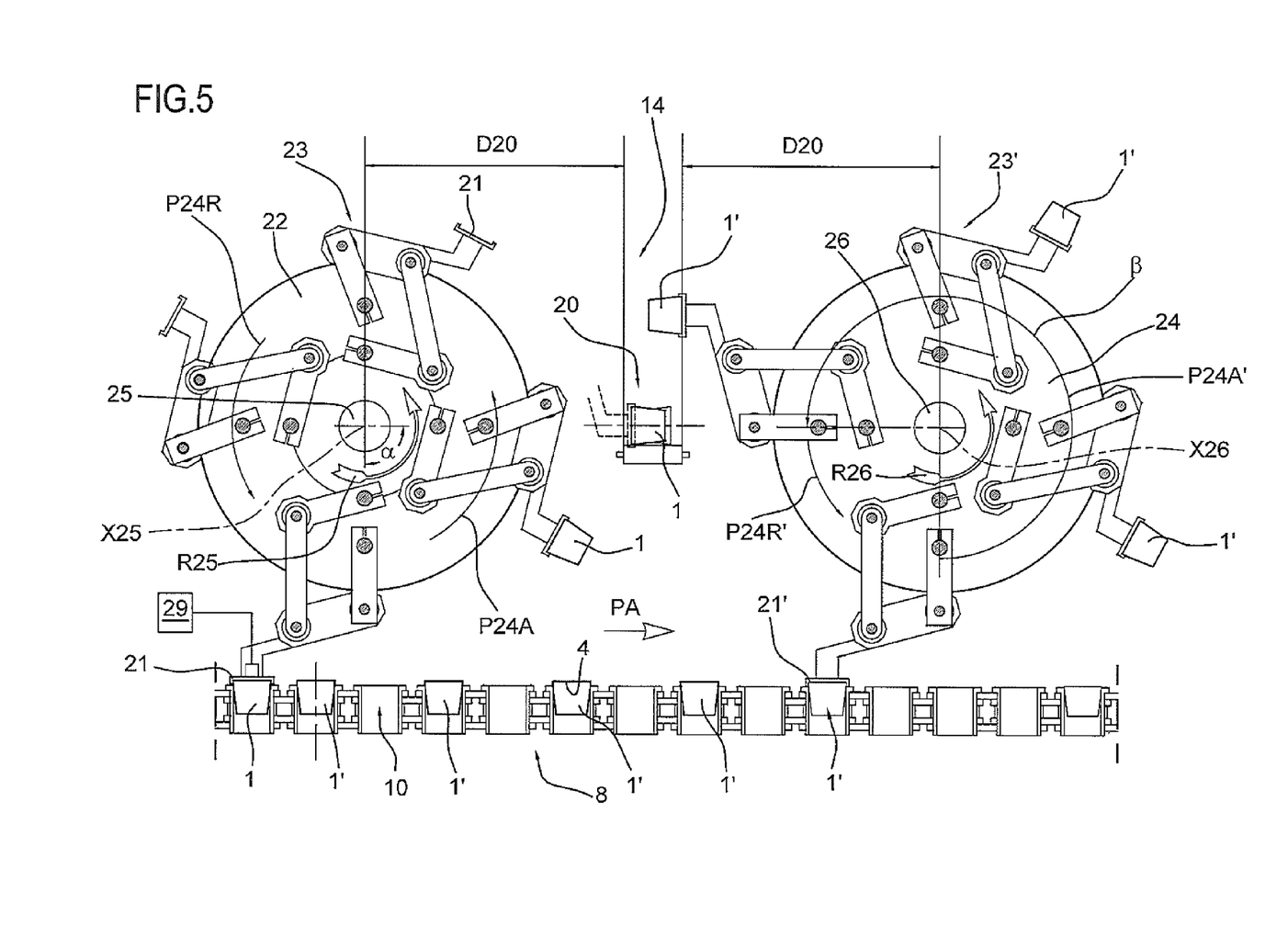
FIG. 5 shows a capsule outfeed station according to the invention for the machine of FIG. 1, in a schematic front view from A.
Figure 6:
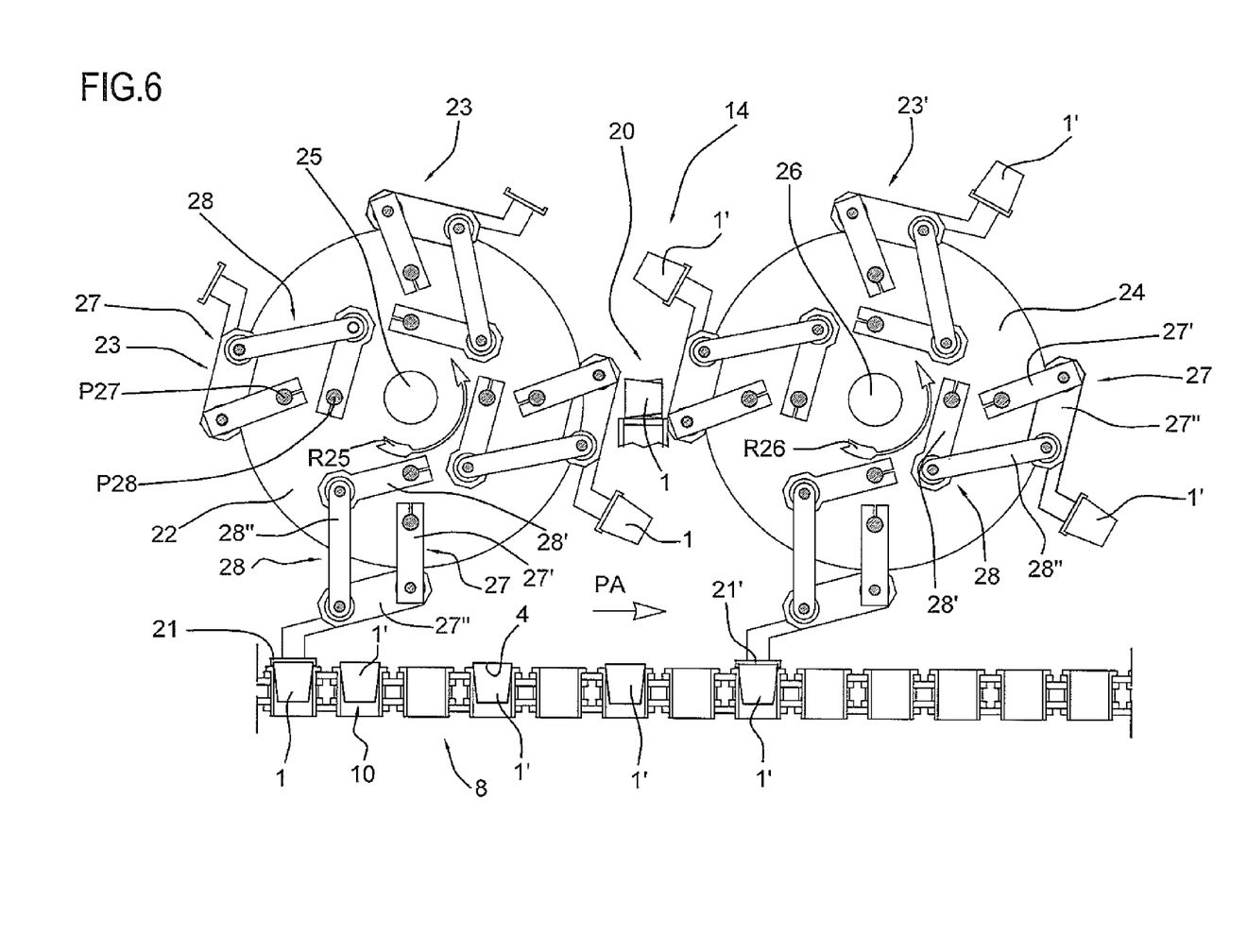
FIG. 6 shows a variant embodiment of the capsule outfeed station according to the invention for the machine of FIG. 1, in a schematic front view from A.

In detail, the first wheel 22 and the second wheel 24 are juxtaposed along a feed direction of the transport element 8.

The first wheel 22 is equipped with movement means 23 for moving respective contact heads 21 for contacting and picking the capsules 1.

The second wheel 24 is equipped with further movement means 23' for moving respective further contact heads 21' for contacting and picking the further capsules 1'.

The movement means 23 and the further movement means 23' are substantially the same, as are the contact head 21 and the further contact head 21'.

It should be noted that the wheels 22, 24 are equipped with respective power-driven shafts 25 and 26, with axes of rotation X25, X26 which are parallel to each other. The receiving table 20 is interposed between the first wheel 22 and the second wheel 24.

Figure 7:
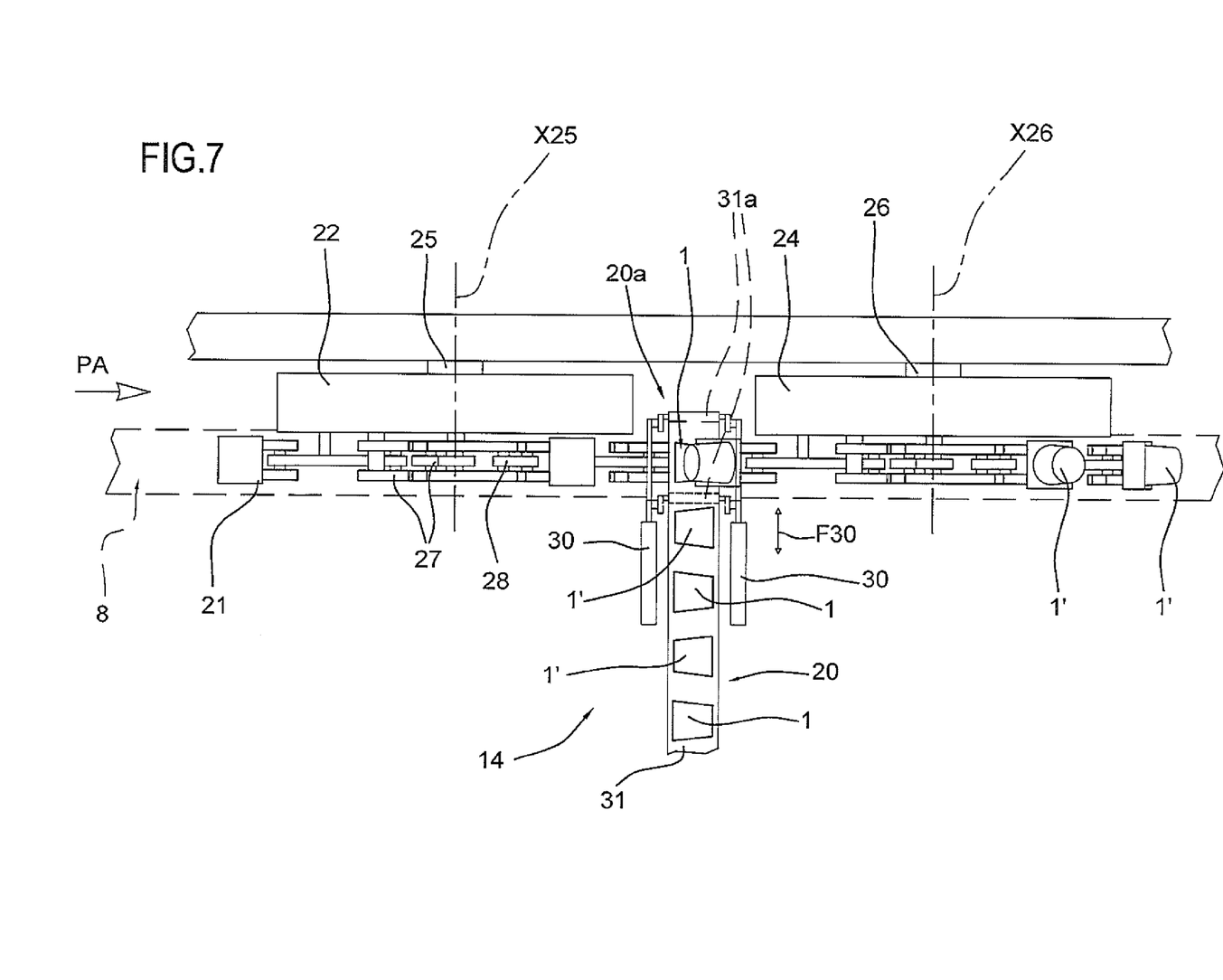
FIG. 7 illustrates the outfeed station of FIG. 6 in a schematic plan view from above, with some parts cut away in order to better illustrate others.

Preferably, the longitudinal extension of the receiving table 20 is parallel to at least one of the axes of rotation X25, X26 of the wheels 22, 24 (see FIG. 7).

In the embodiment of FIG. 7, the longitudinal extension of the receiving table 20 is parallel to the axes of rotation X25, X26 of the wheels 22, 24. Preferably, the power-driven shafts 25, 26 of the respective wheels 22, 24 are in phase with each other and rotate in the same directions of rotation R25, R26 to allow the contact heads 21 and the further contact heads 21' to alternately reach an advanced position for placing the capsules 1 and the further capsules 1', on the receiving table 20, respectively.

Alternatively, the wheels 22, 24 have power-driven shafts 25, 26 which are in phase with each other and rotate in opposite directions of rotation R25, R26 (embodiment not illustrated).

In short, the capsules 1 and the further capsules 1' are alternated, juxtaposed and oriented in opposite directions on the receiving table 20. Advantageously, the capsules 1 and the further capsules 1' are arranged along an outfeed direction perpendicular to the feed direction of the transport element 8.

In other words, it should be noted that the contact head 21 of the first wheel 22 rotates the capsules 1 through a first angle α on the first stretch P24A of path between the transport element 8 and the receiving table 20, while the further contact head 21' of the second wheel 24 rotates the further capsules 1' through a second angle β on a further first stretch P24A' of path between the transport element 8 and the receiving table 20. The value of the first angle α differs from that of the second angle β. The first angle is 360° minus the second angle β.

Advantageously, the first angle α is 90° and the second angle β is 270°. In other words, as will also be explained in more detail below, the architecture and the movement of the wheels 22, 24 is extremely flexible and also allows the capsules 1 and the further capsules 1' to be placed in such a way that they face opposite directions, so their arrangement is ready for final packaging.

Preferably, but not necessarily, the power-driven shafts 25, 26 move the respective wheels 22, 24 continuously, at the same angular speed, and in phase with the transport element 8, which is also moved continuously by the movement means 9.

Preferably, the contact heads 21 and the further contact heads 21' pick the capsules 1 and the further capsules 1', respectively, at different times.

Preferably, the axes of rotation X25, X26 of the power-driven shafts 25, 26 are disposed transversely to the axis Z10 of the pockets 10 of the transport element 8.

Advantageously, the receiving table 20 for the capsules 1 and the further capsules 1' is positioned above the transport element 8.

Preferably, the receiving table 20 is located at a fixed point along the circular path of the wheels 22, 24.

More specifically, the receiving table 20 may be located at a distance D20 from the axes of rotation X25, X26 of the wheels 22, 24, such as to allow the contact heads 21 and the further contact heads 21' in the withdrawn position to pass freely without interfering with each other (see FIG. 5) and such that it can be reached by the contact heads 21 and the further contact heads 21' in the advanced position in order to place the capsules 1 and the further capsules 1', respectively. Alternatively, the receiving table 20 may be located at the same or different distances D20 from the axis of rotation X25 and from the axis of rotation X26.

Alternatively, movement means 30 may be provided for moving the receiving table 20 in the direction indicated by the arrows F30 of FIG. 7 between an advanced position for receiving the capsules 1 and the further capsules 1', where an end portion 20a of the receiving table 20 acts in conjunction with the contact heads 21 and the further contact heads 21' (solid line in FIG. 7), and a withdrawn position, where the end portion 20a of the receiving table 20 does not act in conjunction with the contact heads 21 and the further contact heads 21' (dashed line in FIG. 7).

That way, if the available working space is reduced, the distance between the first wheel 22 and the second wheel 24 may be reduced without reducing the speed and precision in feeding out the capsules 1 and further capsules 1'.

Preferably, but not necessarily, the receiving table 20 may extend transversely to the feed direction of the transport element 8.

In light of this, by way of a non-limiting structural example, the receiving table 20 may comprise a conveyor belt 31 configured to transport the capsules 1 and the further capsules 1' away from the wheels 22, 24 along a direction transversal to the feed direction of the transport element 8.

More specifically, the conveyor belt 31 may be closed in a loop around power-driven pulleys 31a which may be acted upon by the movement means 30.

Preferably, the contact heads 21 and the further contact heads 21' are equipped with suction means 29 for holding the capsules 1 and the further capsules 1' to be picked and placed on the receiving table 20.

For simplicity, the suction means 29 are represented schematically as a block in only one contact head 21 of the first wheel 22 in FIG. 5. It must be understood that all the contact heads 21 and all the further contact heads 21' can be equipped with suction means 29.

The description which follows, although it refers for simplicity to the first wheel 22, to the contact heads 21 and to the movement means 23, applies also to the second wheel 24, to the further contact heads 21' and to the further movement means 23'.

Preferably, the movement means 23 comprise a first pair 27 of articulated arms 27', 27" and a second pair 28 of articulated arms 28', 28" having a corresponding point of connection P27, P28 located on the wheel 22 and in such a way that each pair forms a five-bar linkage.

The contact head 21 is associated (through an arm 21a, advantageously L-shaped) with one of the arms of one pair (in this case, the one labelled 27").

The kinematic structure thus obtained gives the contact head 21 two degrees of freedom and allows it to adopt the aforementioned advanced and withdrawn positions while at same time allowing it to perform an adaptive movement according to the rotational movement of the wheel 22. That way, the contact head 21 can, on the one hand, pick up the capsule 1 with a movement substantially along the longitudinal axis Z10 of the pocket 10 for the time necessary to let it come out of the pocket 10 of the transport element 8 and, on the other, place the capsule 1 on the receiving table 20 in a correct position: this is true even in the presence of continuous relative movements between the first wheel 22, the transport element 8 (that is, with follower type capsule picking system) and the receiving table 20.

The movement of the first pair 27 of arms 27', 27" and of the second pair 28 of arms 28', 28" can be obtained with cam profiles internal of the first wheel 22.

Figure 8:
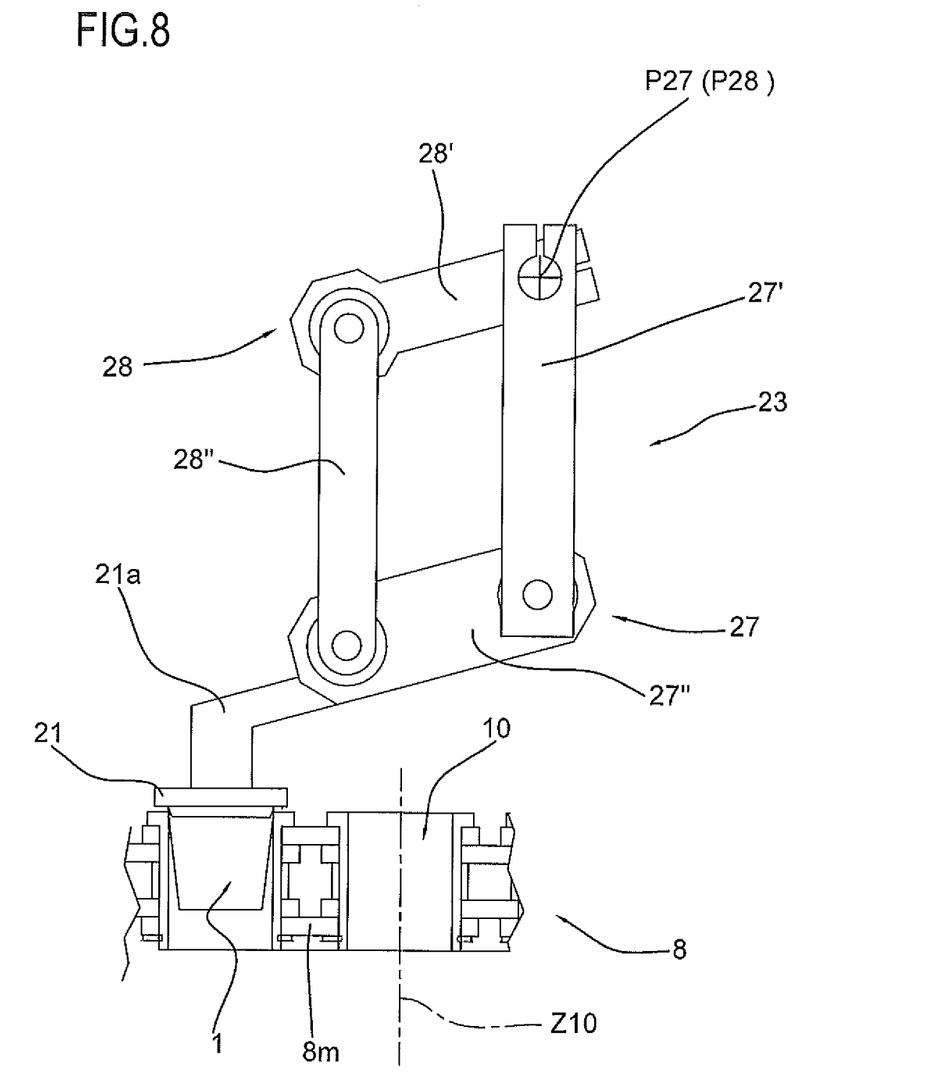
FIG. 8 shows a construction variant of movement means for moving a contact head forming part of the outfeed station of FIGS. 5 and 6.

In an alternative embodiment illustrated in FIG. 8, the first pair 27 of articulated arms 27', 27" and of the second pair 28 of articulated arms 28', 28" have respective points of connection P27, P28 which are superposed on the wheel 22, that is to say, they are positioned along a common axis of rotation parallel to the axis of rotation X25 of the wheel 22, even if the arms are moved independently of each other.

Arranged circumferentially on the wheel 22 there may be two or more units made up of one contact head 21 and the respective movement means 23 with the first pair 27 and the second pair 28 of articulated arms, while maintaining single pick and place points (chain 8 and receiving table 20). In the embodiment illustrated, there are four units on the wheel 22, positioned at 90° from each other as a function of the production speeds necessary for picking the capsules 1 from the transport element 8.

It should be noted that during the course of one full rotation of the first wheel 22—for example anticlockwise with reference to FIG. 5—the contact head 21 is at an advanced, picking position when at the transport element 8, at a withdrawn position when moving along a first stretch P24A of path towards the receiving table 20, at the advanced position again when it places the capsule 1 from the transport element 8 on the receiving table 20 (shown with a dashed line) and, lastly, at a withdrawn position again when moving along a second stretch P24R from the receiving table 20 towards the transport element 8 to pick another capsule.

In FIG. 5, the head 21 at the advanced position where it places the capsule 1 on the receiving table 20 is shown with dashed lines.

In the embodiment illustrated, the first wheel 22 and the second wheel 24 each comprise four units, each made up of a contact head 21 and the respective movement means 23, and a further contact head 21' and the respective movement means 23', respectively.

Thanks to this type of structure, the transport element 8 is progressively emptied of the capsules 1 and of the further capsules 1' on a reduced stretch of the path P, but with the possibility of a high transit speed.

Depending on the productivity required, configurations of the outfeed station 14 with a single wheel 22, or one or more pairs of first wheels 22 and second wheels 24, and with a different number of contact heads 21 are imaginable.

In an embodiment not illustrated, the productivity of the outfeed station 14 can be further increased by increasing the number of units made up of contact heads 21 and movement means 23, by mounting two or more units side by side along directions parallel to the axis of rotation X25 of the corresponding wheel 22. As a result, the transport element 8 will comprise links 8*m* with pockets 10 which are side by side transversely of the feed direction.

In an alternative embodiment not illustrated, the outfeed station 14 may comprise one, two or more receiving tables 20 located at different heights. The invention also provides a process for picking single use capsules 1 for extract or infusion beverages.

According to the invention, the process comprises the following steps:
picking the capsules 1 from respective pockets 10 of a transport element 8 through the agency of at least one contact head 21 connected to movement means 23 of a first wheel 22;
moving the capsules 1 away from the respective pockets 10 by a movement of the movement means 23, this movement being combined with a rotation of the first wheel 22 in a first direction R25;
transporting the capsules 1 held by the contact head 21 along a first stretch P24A of path with a curved trajectory, which allows a first rotation of the capsules 1 through a first angle α, towards a receiving table 20;
placing the capsules 1 on the receiving table 20 through the agency of the at least one contact head 21 at the end of the first stretch P24A of path;
feeding out the capsules 1 along the receiving table 20 away from the first wheel 22.

Preferably, the process according to the invention comprises the following further steps:

picking further capsules 1' from the respective further pockets 10 of the transport element 8 through the agency of at least one further contact head 21' connected to further movement means 23' of a second wheel 24; the further capsules 1' being picked downstream of the capsules 1 relative to a feed direction PA of the transport element 8;
moving the further capsules 1' away from the respective further pockets 10 by a further movement of the further movement means 23'; the further movement being combined with a rotation of the second wheel 24 in a second direction R26, the second direction R26 being the same as the first direction R25, and the second wheel 24 being mounted alongside the first wheel 22 along a feed direction of the transport element 8;
transporting the further capsules 1' held by the further contact head 21' along a further first stretch P24A' of path with a curved trajectory, which allows a second rotation of the further capsules 1' through a second angle β towards the receiving table 20;
placing the further capsules 1' on the receiving table 20 through the agency of the further contact head 21' at the end of the further first stretch P24A' of path;
feeding out the capsules 1 and the further capsules 1' along the receiving table 20 away from the second wheel 24.

At the end of the respective placing steps, the further capsules 1' are juxtaposed with, and oriented in the opposite direction to, the capsules 1 on the receiving table 20.

Advantageously, at the end of the respective placing steps, the further capsules 1' are alternated with the capsules 1 on the receiving table 20.

The value of the second angle β differs from that of the first angle α.

The value of the second angle β is 360° minus α.

In light of this, the further contact head 21', following a rotation of the second wheel 24 through the second angle β, places the further capsule 1' on the receiving table 20 oriented in the opposite direction relative to the capsule 1 placed by the first wheel 22. In other words, the capsules 1 and the further capsules 1' are at 180° from each other about an axis parallel to the axes of rotation X25, X26 of the wheels 22, 24 (see FIG. 7).

Preferably, the first wheel 22 and the second wheel 24 rotate at the same speed.

It should be noted that the two degrees of freedom of the heads 21 and further heads 21' allow the capsules 1 and further capsules 1' to be placed precisely and surely on the receiving table 20 during the placing step. In other words, the capsules are prevented from falling and from being placed incorrectly.

In light of this, the placing step causes the capsules 1 and the further capsules 1' to be positioned on the receiving table 20 with their longitudinal axes lying transversely, preferably perpendicularly, to the vertical axes Z10 of the respective pockets 10 of the transport element 8.

Preferably, the machine 100 also comprises a cleaning station 17 for cleaning the rim 5 of the upper aperture 4 of the rigid container 2 and positioned downstream of the dosing station 12 with respect to a feed direction PA of the transport element 8.

Preferably, the cleaning station 17 is interposed between the dosing station 12 and a weighing station 15 (described below).

The cleaning station 17, too, is positioned along the path P and is configured to operate continuously, or step by step, and in phase with the transport element 8.

As mentioned above, the machine 100 comprises a weighing station 15 which weighs the rigid container 2 containing the product dose 6 and which is positioned along the path P of the transport element 8. It should be noted that the weighing station 15 is configured to operate continuously, or step by step, and in phase with the transport element 8.

Preferably, the weighing station 15 is interposed between the dosing station 12 (or, more specifically, the cleaning station 17) and the closing station 13.

Preferably, the machine 100 comprises a cutting station 16 where the length of sheet 7 is cut and placed on the aperture 4 of the rigid container 2.

The cutting station 16, too, is positioned along the path P of the transport element 8, is configured to operate continuously, or step by step, and in phase with the transport element 8 and is located upstream of the closing station 13 with respect to a feed direction PA of the transport element 8.

Preferably, the machine 100 comprises a stacking station 18 for stacking the capsules and which is positioned close to the outfeed station 14 described above.

Preferably, the path P of the transport element 8 is also defined by a plurality of power-driven transmission wheels 9, rotating about vertical axes Z9 and mounted (for example, keyed) to a supporting frame 19 extending in a horizontal plane; these power-driven wheels 9 define the above mentioned movement means.

It should be noted that the power-driven transmission wheels 9 are positioned along the frame 19 to define an operative, non-linear portion of the path P (completed by the passage along or around the above mentioned operating stations), and a non-operative return portion of the path P.

The set aims are thus achieved thanks to a machine and process according to the invention.

More specifically, the operating flexibility provided by the contact heads and by the respective movement means allows the capsules to be picked and placed at high speed, precisely and without the risk of damaging them.

The synchronized rotation of the wheels with the interposed receiving table allows the capsules to be arranged on the receiving table in such a way that they are ready for final packaging.

The paired wheel structure is very flexible and makes it possible to create modular systems with pluralities of juxtaposed pairs as a function of production needs and operating at different and higher speeds.

The invention claimed is:

1. A beverage capsule machine for making single use capsules (1, 1') for extract or infusion beverages such as coffee or tea, comprising a rigid, cup-shaped container (2) having a bottom (3) and an upper aperture (4) provided with a rim (5), a dose (6) of extract or infusion product contained inside the rigid container (2) and a length of sheet (7) for closing the upper aperture (4) of the rigid container (2), the machine comprising: a transport element (8) for transporting rigid containers (2) and being closed in a loop around power driven transmission wheels (9) for moving the transport element (8); wherein the transport element (8) is configured to define a plurality of pockets (10) for receiving the rigid containers (2) and which are positioned one after the other, in succession, each having a respective vertical axis (Z10) and a plurality of stations which are positioned along a path (P) followed by the transport element (8) and which are configured for operating in phase with the same transport element (8) and comprising: a feed station (11) for feeding the rigid containers (2) into respective pockets (10) of the transport element (8); a dosing station (12) for dosing the product into the rigid container (2); a closing station (13) where the upper aperture (4) of the rigid container (2) is closed with the length of sheet (7); and an outfeed station (14) which withdraws the capsules (1, 1') from the transport element (8);

wherein the outfeed station (14) comprises:

a first wheel (22) equipped with at least one contact head (21) for contacting and picking a capsule (1) from a respective pocket (10) of the transport element (8) and placing the capsule (1) on a receiving table (20); wherein the first wheel is further equipped with a first articulated member (23) for moving the at least one contact head (21) from an advanced position to contact and pick the capsule (1) from the respective pocket (10) of the transport element (8) and to place the capsule (1) on the receiving table (20), to a withdrawn position when the contact head (21) is in transit; wherein the first wheel (22) is configured to rotate the at least one contact head (21) and the first articulated member (23) and to carry the at least one contact head (21) from the pocket (10) of the transport element (8) to the receiving table (20) along a first stretch (P24A) of path, and from the receiving table (20) to the transport element (8) along a second stretch (P24R) of path; and a second wheel (24) equipped with at least one further contact head (21') to contact and pick a further capsule (1') from a respective pocket (10) of the transport element (8) and place the further capsule (1') on the receiving table (20); wherein the second wheel is further equipped with a second articulated member (23') for moving the at least one further contact head (21') from an advanced position to contact and pick the further capsule (1') from the respective pocket (10) of the transport element (8) and to place the further capsule (1') on the receiving table (20), to a withdrawn position when the further contact head (21') is in transit; wherein the second wheel (24) is configured to rotate the at least one further contact head (21') and the second articulated member (23') and to carry the at least one further contact head (21') from the pocket (10) of the transport element (8) to the receiving table (20) along a further first stretch (P24A') of path, and from the receiving table (20) to the transport element (8) along a further second stretch (P24R') of path;

wherein the first wheel (22) and the second wheel (24) are equipped with respective power driven shafts (25, 26) which are in phase with each other and which rotate in the same direction of rotation (R25, R26) to allow the at least one contact head (21) and the at least one further contact head (21') to place capsules (1) and further capsules (1') on the receiving table (20), respectively, the further capsules (1') being alternated, juxtaposed and oriented in the opposite direction relative to the capsules (1) on the receiving table (20).

2. The machine according to claim 1, wherein the receiving table (20) is located above the transport element (8); the receiving table (20) being located at a distance (D20) from an axis of rotation (X25) of the first wheel (22) and from an axis of rotation (X26) of the second wheel (24), such as to allow the at least one contact head (21) and the at least one further contact heads (21') in the withdrawn position to pass freely without interfering with the receiving table (20).

3. The machine according to claim 1, comprising moving elements (30) for moving the receiving table (20) between an advanced position for receiving the capsule (1) and the further capsule (1'), where an end portion (20a) of the receiving table (20) acts in conjunction with the at least one contact head (21) and the at least one further contact head (21'), respectively, and a withdrawn position, where the end portion (20a) of the receiving table (20) does not act in conjunction with the at least one contact head (21) and with the at least one further contact head (21'), respectively.

4. The machine according to claim 1, wherein the receiving table (20) comprises a conveyor belt (31) configured to transport the capsules (1) and the further capsules (1') away from the first wheel (22) and from the second wheel (24) along a direction transversal to a feed direction of the transport element (8).

5. The machine according to claim 1, wherein the first wheel (22) and the second wheel (24) are keyed to respective power-driven continuous movement shafts (25, 26), with horizontal axes (X25, X26), in phase with the transport element (8) which is moved continuously by the power-driven transmission wheels (9).

6. The machine according to claim 1, wherein the first articulated member (23) and the second articulated member (23') each comprising a first pair (27) of articulated arms (27', 27") and a second pair (28) of articulated arms (28', 28") having corresponding points of connection (P27, P28) located on the first wheel (22) and on the second wheel (24), respectively; the at least one contact head (21) being associated with one of the arms (27', 27", 28', 28") of the first pair (27) and of the second pair (28) of the first articulated member (23) and the at least one further contact head (21') being associated with one of the arms (27', 27", 28', 28") of the first pair (27) and of the second pair (28) of the second articulated member (23') in such a way as to give the at least one contact head (21) and the further contact head (21') two degrees of freedom and allow it to adopt the aforementioned advanced and withdrawn positions while at the same time allowing it to perform an adaptive movement according to the rotational movement of the first wheel (22) and of the second wheel (24), respectively.

7. The machine according to claim 6, wherein the first pair (27) of articulated arms (27', 27") and the second pair (28) of articulated arms (28', 28") have corresponding points of connection (P27, P28) which are superposed on the first wheel (22) and on the second wheel (24), respectively, and which are, in particular positioned along a common axis, parallel to an axis of rotation (X25, X26) of the first wheel (22) and of the second wheel (24), respectively.

8. The machine according to claim 1, wherein the at least one contact head (21) and the at least one further contact head (21') are equipped with a suction member (29) for holding the capsules (1) and the further capsules (1'), respectively.

9. A process for picking and placing single use capsules (1) for extract or infusion beverages, made in a machine (100) comprising a transport element (8) closed in a loop around a power-driven transmission element (9) designed to move the transport element (8); the transport element (8) being configured to define a plurality of pockets (10), for receiving the capsules (1), which are positioned one after the other, in succession, and each of which has a respective vertical axis (Z10),
characterized in that it comprises the following steps:
picking the capsules (1) from respective pockets (10) of the transport element (8) through the agency of at least one contact head (21) connected to a first articulated member (23) of a first wheel (22);
moving the capsules (1) away from the respective pockets (10) by a movement of the first articulated member (23) combined with a rotation of the first wheel (22) in a first direction (R25);
transporting the capsules (1) held by the at least one contact head (21) along a first stretch (P24A) of path with a curved trajectory, which allows a first rotation of the capsules (1) through a first angle (a) towards a receiving table (20);
placing the capsules (1) on the receiving table (20) through the agency of the at least one contact head (21) at the end of the first stretch (P24A) of path;
picking further capsules (1') from respective pockets (10) of the transport element (8) through the agency of at least one further contact head (21') connected to a second articulated member (23') of a second wheel (24); the further capsules (1') being picked downstream of the capsules (1) relative to a feed direction (PA) of the transport element (8);
moving the further capsules (1') away from the respective pockets (10) by a further movement of the further movement means (23') combined with a rotation of the second wheel (24) in a second direction (R26) which is the same as the first direction of rotation (R25) of the first wheel (22), the first wheel (22) being mounted alongside the second wheel (24);
transporting the further capsules (1') held by the at least one further contact head (21') along a further first stretch (P24A') of path with a curved trajectory, which allows a second rotation of the further capsules (1') through a second angle (p), different from the first angle (a), towards the receiving table (20);
placing the further capsules (1') on the receiving table (20) through the agency of the at least one further contact head (21') at the end of the further first stretch (P24A') of path, the further capsules (1') being alternated, juxtaposed and oriented in the opposite direction relative to the capsules (1) on the receiving table (20); and
feeding out the capsules (1) and the further capsules (1') along the receiving table (20) away from the first wheel (22) and the second wheel (24).

10. The process according to claim 9, wherein the second angle (β) is 360° minus the first angle (a).

11. The process according to claim 9, comprising a step of alternately moving the receiving table (20) between an advanced position for receiving the capsule (1) and the further capsule (1'), where an end portion (20a) of the receiving table (20) acts in conjunction with the at least one contact head (21) and the at least one further contact head (21'), respectively, and a withdrawn position, where the end portion (20a) of the receiving table (20) does not act in conjunction with the at least one contact head (21) and with the at least one further contact head (21'), respectively.

12. The process according to claim 9, wherein the transport element (8), the first wheel (22) and the second wheel (24) are continuously movable.

13. The process according to claim 9, wherein the steps of picking the capsules (1) and the further capsules (1') from the respective pockets (10) is performed in by the at least one contact head (21) and by the at least one further contact head (21'), respectively, relative to the continuously movable transport element (8).

* * * * *

UNITED STATES PATENT AND TRADEMARK OFFICE
CERTIFICATE OF CORRECTION

PATENT NO.        : 9,708,134 B2
APPLICATION NO.   : 14/377744
DATED             : July 18, 2017
INVENTOR(S)       : Dario Rea et al.

Page 1 of 1

It is certified that error appears in the above-identified patent and that said Letters Patent is hereby corrected as shown below:

In the Claims

In Column 14, Line 30, being Line 45 of Claim 9, please delete "through a second angle (p), different from the first angle" and insert therefor -- through a second angle (β), different from the first angle --

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*